US006346690B1

(12) United States Patent
Ulrich et al.

(10) Patent No.: US 6,346,690 B1
(45) Date of Patent: Feb. 12, 2002

(54) INDUCTION HEATING SYSTEM WITH A FLEXIBLE COIL

(75) Inventors: Mark Ulrich, New London; David M. Bickel, Oshkosh; Don Wiseman, Neenah; Randall Baxter, Black Creek, all of WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/665,844

(22) Filed: Sep. 20, 2000

Related U.S. Application Data

(63) Continuation of application No. 09/499,222, filed on Feb. 7, 2000, now Pat. No. 6,229,126, which is a continuation of application No. 09/072,887, filed on May 5, 1998.

(51) Int. Cl.[7] ................................................ H05B 6/10
(52) U.S. Cl. ........................ 219/635; 219/643; 219/645; 219/662; 219/672
(58) Field of Search ................................ 219/635, 643, 219/644, 647, 656, 663, 672, 674, 629, 645, 664, 601–603, 607, 617, 637, 640, 660–662, 665, 666, 668; 29/605

(56) References Cited

U.S. PATENT DOCUMENTS

| | | | |
|---|---|---|---|
| 3,725,629 A | | 4/1973 | Vickers |
| 3,946,349 A | | 3/1976 | Haldeman, III |
| 4,160,967 A | | 7/1979 | Beech |
| 4,222,023 A | | 9/1980 | Beech |
| 4,296,295 A | | 10/1981 | Kiuchi |
| 4,950,348 A | | 8/1990 | Larson |
| 5,101,086 A | * | 3/1992 | Dion et al. ............... 219/632 |
| 5,208,433 A | | 5/1993 | Hellegouarc'h et al. |
| 5,319,179 A | | 6/1994 | Joecks et al. |
| 5,343,023 A | | 8/1994 | Geissler |
| 5,352,871 A | * | 10/1994 | Ross et al. ............... 219/633 |
| 5,412,184 A | * | 5/1995 | McGaffigan ............... 219/643 |
| 5,461,215 A | * | 10/1995 | Haldeman ............... 219/677 |
| 5,466,916 A | * | 11/1995 | Iguchi et al. ............... 219/633 |
| 5,504,309 A | | 4/1996 | Geissler |
| 5,526,561 A | * | 6/1996 | McGaffigan ............... 29/605 |
| 5,714,738 A | * | 2/1998 | Hauschulz et al. ......... 219/535 |
| 5,721,413 A | | 2/1998 | Moe |
| 5,739,506 A | | 4/1998 | Hanton et al. |
| 5,773,799 A | | 6/1998 | Maxfield et al. |
| 5,786,575 A | * | 7/1998 | Bleske et al. ............... 219/633 |
| 5,786,576 A | * | 7/1998 | Lunden ...................... 219/672 |
| 5,919,387 A | | 7/1999 | Buckley et al. |

FOREIGN PATENT DOCUMENTS

FR        2663491        6/1990

OTHER PUBLICATIONS

Eliminating welding disruption for pipe and other application, Nov. 1991, The Fabricator.
400 Cycle Induction Heating with proportional contol for Preheating and Stress Relieving or Welding Joints. Hobart Booklet.
Instructions Installation–Operation–Maintenance for High Frequency Induction Heaters Specs 4438, Hobart Brothers Co.
400 Cycle completely "automatic proportional" or manual control Brochure.

* cited by examiner

*Primary Examiner*—Tu Ba Hoang
(74) *Attorney, Agent, or Firm*—George R. Corrigan

(57) ABSTRACT

A method and apparatus for induction heating includes a power supply, and a controller, and an induction head. The induction head includes a flexible coiled, such as one formed with Litz wire. The head also includes a thermal insulator, for disposing between the head and the workpiece. The insulator reflects heat back to the workpiece, protecting the coil, but is transparent to inductive (E-M) energy. The power supply is a variable output frequency power supply, such as one having a resonant tank, to adapt to the inductance of the head.

8 Claims, 2 Drawing Sheets

INDUCTION HEATING SYSTEM WITH A FLEXIBLE COIL

This is a continuation of application Ser. No. 09/499,222, filed Feb. 7, 2000, entitled Induction Heating System With A Flexible Coil, and issued on May 8, 2001 as U.S. Pat. No. 6,229,126, which is a continuation of U.S. patent application Ser. No. 09/072,887 filed May 5, 1998, entitled Induction Heating system With A Flexible Coil.

FIELD OF THE INVENTION

The present invention relates generally to the art of induction heating. More specifically, it relates to induction heating using a flexible induction head.

BACKGROUND OF THE INVENTION

Induction heating is a well known method for producing heat in a localized area on a susceptible metallic object. Induction heating involves applying an AC electric signal to a heating loop or coil placed near a specific location on or around the metallic object to be heated. The varying or alternating current in the loop creates a varying magnetic flux within the metal to be heated. Current is induced in the metal by the magnetic flux, thus heating it. Induction heating may be used for many different purposes including curing adhesives, hardening of metals, brazing, soldering, and other fabrication processes in which heat is a necessary or desirable agent.

The prior art is replete with electrical or electronic power supplies designed to be used in an induction heating system, many of which have inverter power supplies. Such inverter power supplies typically develop high frequency signals, generally in the kilohertz to megahertz range, for application to the work coil. Because there is generally a frequency at which heating is most efficient with respect to the work to be done, some prior art inverter power supplies operate at a frequency selected to optimize heating. Heat intensity is also dependent on the magnetic flux created, therefore some prior art induction heaters control the current provided to the heating coil, thereby attempting to control the heat produced. The prior art induction heaters described in U.S. Pat. Nos. 5,343,023 and 5,504,309 (assigned to the present assignee and hereby incorporated by reference) provide frequency control and a way to control the heat or power delivered to the workpiece.

Typical prior art induction heads are formed using rigid copper tubes. The tube is shaped to follow the contour of the workpiece or area of the workpiece to be heated. The rigidity of the tubing prohibits users from modifying the heat pattern (determined by the shape of the tubing) more than minimally. Consequently, induction heating customers have been required to purchase a unique (and expensive) coil for each heating application.

Also, copper tubing can be lossy at high frequencies. Approximately 90 percent the current is carried within two skin depths of the outer surface of a conductor (the skin depth of copper is about 0.0116 inches at 50 KHz, and decreases with increasing frequency.). Typical thin wall copper tube has walls approximately 0.046 inches thick. This is approximately four skin depths at 50,000 Hz. Thus, approximately ½ of the copper tube is not carrying any appreciable power. This forces the outer sleeve to carry more current than might be expected in such a conductor. Thus, the $I^2R$ losses may be higher than desirable. The copper tubes were cooled using a coolant flowing through the middle of the tube.

One prior art induction head, described in U.S. Pat. No. 5,412,184, was used in an induction heating tool having a jaw like structure. on which the induction coil was mounted. The jaw like structure is opened to receive a sleeve within the. jaw. The jaw was then closed over the sleeve, and the sleeve was heated by the induction coil mounted on the jaw. The induction coil includes an inner coil for heating comprised of flexible copper bands surrounded by ferrite rods which help direct the flux to the part to be heated. Coils comprised of Litz wire on the outside of the ferrite (relative to the workpiece) reduce electromagnetic radiation from the tool, but do not heat the part. This tool suffers from several drawbacks. First, the applicability of the tool was limited to the distance which the jaws could open. Second, the coils, while flexible in a limited fashion, could only be shaped in a closed circle (in the jaws were closed) or a partially opened circle, when the tool is being loaded with a workpiece. The flexibility was also limited to a single direction because copper bands form the coil. Also, the tool was small and useful for heating only small workpieces.

There are at least two prior art arrangements used to inductively heat a large workpiece. One is to provide an induction coil shaped to generally coincide with the workpiece to be heated. This type of head suffers in that it must be dedicated to a single use. The other arrangement is to have a number of induction heads, each of which cures a selected portion of the workpiece. This type of head suffers that it is not useful for curved workpieces and requires multiple heads. Both of these arrangements are described in U.S. Pat. No. 4,950,348.

One new application of induction heating is using an induction heating system to preheat a thick workpiece, such as a pipe, before it is welded. Pipes are often formed by taking a flat piece of steel and rolling the steel. A longitudinal weld is then made along the ends of the rolled steel, thus forming a section of pipe. A pipe line may be formed by circumferential welding adjacent sections of pipe together. Other applications of welding relatively thick steel (or other material) include ship building, railroad yards, tanker trucks, or other higher strength alloy welding.

Pre-heating is used to raise the temperature of the workpiece along the weld path because the filler metal binds to the workpiece better when the weld path is heated, particularly when a high-alloy steel is being welded, and because it lessens undesirable fast cool-down. Without preheating there is a greater likelihood that the filler metal won't properly bind with the workpiece, and a crack may form. Preheating is often used for heating steel having a thickness of more than about ½", or when the part or ambient temperature is very low. (As used herein "preheating" a weld path means heating the workpiece along the weld path to a pre-weld temperature, or a temperature sufficient to reduce the likelihood of a crack forming along the weld path.) Generally, the steel is preheated to about 300° F. prior to welding. Thus, when a weld is being preheated, the temperature can be high enough to damage nearby components. One system for using induction heat for preheating a weld is described in U.S. patent application Ser. No. 09/052,541, filed on Mar. 31, 1998, entitled Method and Apparatus for Welding, and owned by the present assignee, which is hereby incorporated by reference. Prior to the use of induction heat, slow-heating gas fired "rosebud" heaters were used.

A similar pre-heating application is blades to pre-heat used on heavy machinery. Blades had been preheated in furnaces, and then moved to a weld location where a hard-coat was applied. Induction heat will work well for this application. Other heating applications for which induction heating could be used include curing/bonding painting, or infrared heating.

The workpiece temperature, and heating and cooling rates, also affect the grain structure of a weld. Generally, rapid heating and rapid cooling (heat stress) may adversely affect the grain structure of a weld, wherein the weld will be more prone to cracking. Accordingly, heat stress to a weld may be reduced by reheating a weld, or by controlling the rate of heating or cooling of the weld.

There would be a substantial advantage to a user if a flexible coil is used for induction heating: one coil could be used to heat different parts of various sizes and shapes. Such an application would be preheating of welding materials. Another application is preheating of motor windings prior to a trickle varnish coating, thus eliminating the need for vacuum impregnations.

Thus, an induction heating system with an induction head capable of being bent or formed to the shape of the workpiece to be heated is desirable. Preferably, the induction head will be capable of lying flat, or at least opening to 180 degrees, to allow it to be wrapped around the part to be welded. The induction head will preferably be capable of being wrapped around a pipe, so as to be capable of forming a complete circle. Additionally, such an induction head would preferably be capable of being formed to have sharp angle bends, so is to be adaptable for use with a wide variety of workpieces. Also, such an induction head will preferably include a thermal insulator to protect it from heat damage from the part being heated and to retain the heat in the workpiece.

SUMMARY OF THE PRESENT INVENTION

According to a first aspect of the invention a system for induction heating includes a power supply, a controller, and an induction head. The controller controls the power supply, and the power supply delivers power to the head. The head is comprised of a flexible coil disposed within a flexible thermal insulator.

In one alternative the flexible coil is comprised of a Litz wire. The coil is capable of flexing open to at least 180°, or of flexing to form substantially sharp angles.

The thermal insulator is comprised of material including glass in one embodiment. The thermal insulator is a blanket that may generally lay flat, and the coil is between tow sides of the blanket. The thermal insulator is on the workpiece side of the blanket.

The blanket includes pockets in which the wire is disposed or uses velcro to hold the coils in various alternatives.

The flexible coil is comprised of a loop in a plane, and the wire is flexible in at least a direction perpendicular to the first plane in one alternative. The coil in the induction head is formed by at least one segment of wire having a length in one direction and another segment of wire having a length in another direction and the induction head is flexible in the first direction in another alternative.

In another alternative the power supply and induction head are tuned to one another.

An induction heating system includes a power supply, a controller that controls the power supply, and an induction head that receives power from the power supply, according to a second aspect of the invention. The induction head is comprised of a coil that delivers energy to the workpiece, formed with Litz wire having at least one first segment of wire having a length in a first direction and at least one second segment of wire having a shorter length in a second direction, other than the first direction. The head is flexible in the first direction.

A third aspect of the invention is a system for induction heating that includes a power supply a controller and an induction head. The induction head is comprised of a flexible coil of Litz wire that delivers energy to the workpiece, including a wire that may form a loop in a first plane, and wherein the wire is flexible in at least a direction perpendicular to the first plane.

Other aspects of the invention include an induction head such as those described above, without the power supply, or using a variable frequency power supply in the induction heating systems described above.

Other principal features and advantages of the invention will become apparent to those skilled in the art upon review of the following drawings, the detailed description and the appended claims.

Figure 1:
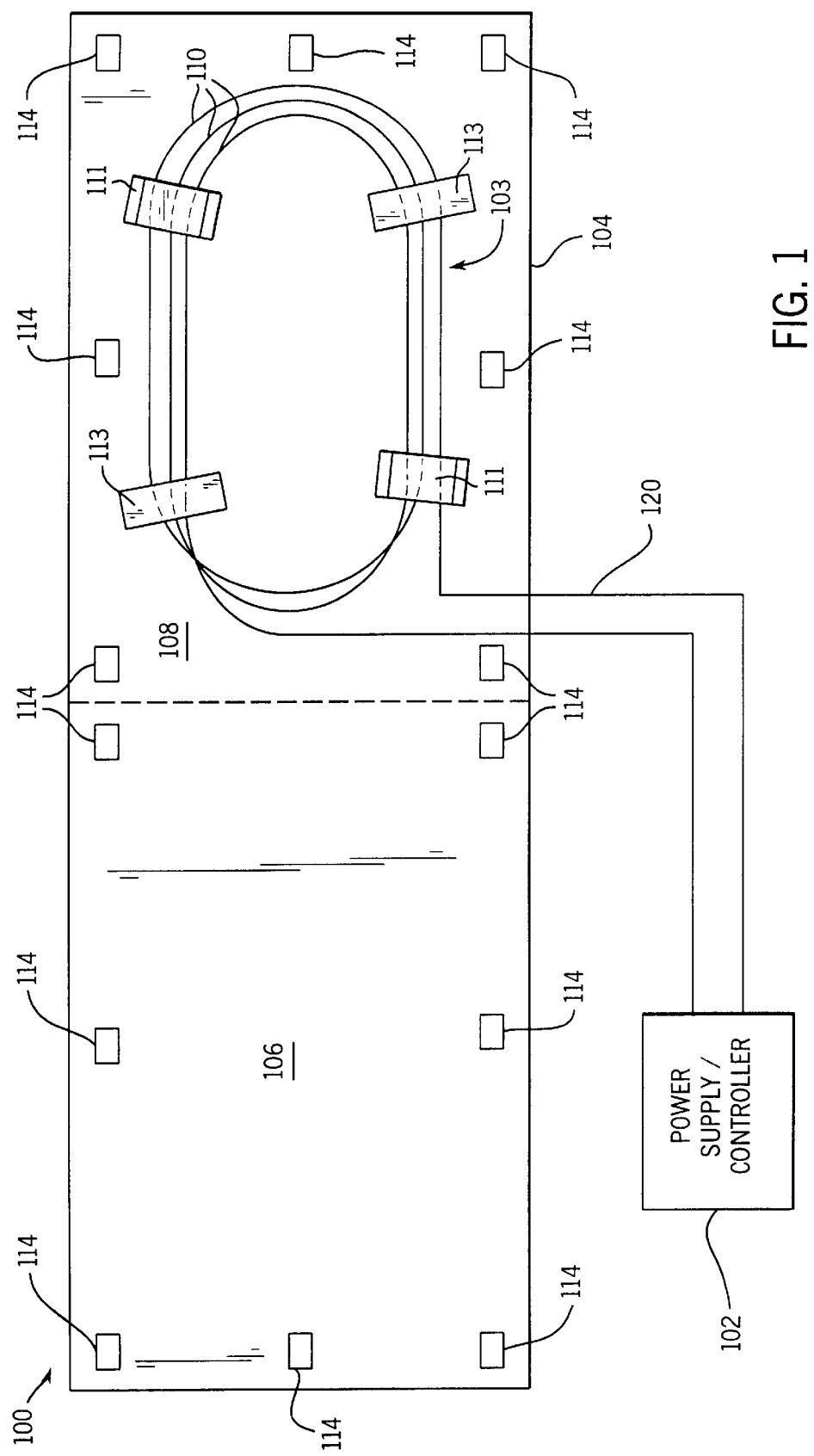
FIG. 1 is a diagram of an induction heating system embodying the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular induction head system used for particular purposes, it should be understood at the outset that the invention may also be employed for other purposes, and implemented using other induction heads and systems.

Generally, the induction head of the present invention is comprised of Litz wire or cable in the preferred embodiment. Cable formed by braiding together strands of individual wires having a very small diameter wire (36 A.W.G. e.g.), but individually insulated, is called a Litz wire. Litz wire uses virtually all the copper for carrying current because the individual strands of wire are by smaller than the skin depth of copper at 50,000 Hz. Therefore, it is more efficient than thin walled copper tubing.

For example, in a typical induction heating application using a ¼ inch inner diameter copper tube to carry 800 amps, the losses approach 8 KW. Using a comparable coil constructed from Litz wire, the losses drop to about 1500 watts. However, the Litz wire may still be water cooled, or an insulator provided between the wire and the workpiece, to prevent overheating. Additionally, Litz wire is flexible, so an induction head formed using a Litz wire as the coil may be flexible and can be used to heat different parts of various sizes and shapes.

Referring now to FIG. 1, an induction heating system 100 that embodies the present invention is shown.

Induction heating system 100 generally includes a combination power supply/controller 102, an induction coil 103, and a blanket 104.

Power supply/controller 102 may be packaged in a single unit, or may be separate housings, one for the power supply, and one for the controller. A Miller IHPS II™ five kilowatt induction heating power supply and controller is used in the preferred embodiment. A Miller Intellifire 250™ 25 kilowatt IHPS is used in an alternative embodiment. Induction heating power supplies such as these are described n U.S. patent application Ser. No. 08/636,161, filed Apr. 22, 1996, entitled Multiple Head Inductive Heating System, and U.S. patent application Ser. No. 08/635,771, filed Apr. 22, 1996, entitled Controller For An Inductive Heating System, U.S. Pat. No. 5,504,309, entitled Induction Heater Having Feedback Control Responsive to Heat Output, and issued on Apr. 2, 1996, all of which are owned by the present Assignee, and are hereby incorporated by reference.

The power supply in the preferred embodiment includes a resonant tank. The resonant tank "self-tunes" (within a range of frequencies) to the resonant frequency of a tank circuit including capacitors in the power source and the induction head. The "self-tuning" provides a very efficient power transfer. This is particularly useful for a flexible induction head because the head inductance is not constant. Rather, the inductance changes based on coupling to the part being heated, and the loop formed if the head is wrapped around the part. However, the resonant tank frequency will naturally be the resonant frequency, and this insures efficient operation. If a frequency outside the available range is needed "coarse" adjustment is provided by changing capacitors that are part of the power supply. The capacitors change the frequency response of the power supply so as to more efficiently transfer energy from the power supply to the induction coil, and then to the workpiece. Alternatively, a user adjustable frequency output maybe used. A variable frequency power supply (i.e. where the output frequency varies naturally or by user setting) is preferred to provide proper coupling.

Coil 103 is formed from a plurality of loops 110 of Litz wire. The Litz wire may be bent in any direction, and in rather sharp angles. The Litz wire shown in FIG. 1 is shaped in a loop for use with preheating weld paths in applications such as pipe welding, blades on heavy equipment, or heating motor windings. Coil 103 is connected to power supply 102 by power lines 120, which may be encased in PVC to prevent damage thereto. Alternatives include using two 43,000 CM Litz wires in parallel to form coil 103, potted Litz wire, or small coils that may be easily moved from one location in the blanket to another location in the blanket.

Coil 103 is placed on a blanket 104. Blanket 104 includes two portions, an insulated portion 108 and a protective portion 106. The portions may be bound or quilted together. Protective portion 106 is a tough and wearable layer that withstands rough handling in a dirty and abrasive environment, and is folded over insulated portion 108 when the induction head is in use. The head is then placed over the workpiece such that it spans the portion of the workpiece to be heated. Protective portion 106 protects loops 110 while the head is in use. Insulated portion 108 insulates loops 110 from heat from the workpiece.

Protective portion 106 may be held in place over insulated portion 108 using Velcro fasteners 114. Of course, other fasteners, belts, straps or arrangements may be used. Generally, the protective layer should be comprised of a heat resistant material on the work side (woven glass fiber, woven ceramic fiber, woven alumina-silica fiber, potentially some organic materials depending on the maximum work temperature desired) and can be made from any tough material on the other side (such as an inexpensive organic material fiber such as nylon, polypropylene or kevlar).

Insulated portion 108 is comprised of 0.125 in. Manniglass™ 1200 in the preferred embodiment. This material is a non-woven glass fiber which provides a thermal barrier. The insulating material is enclosed in Nomex™ 410 in the preferred embodiment. Alternative materials include Needlefelt Aramid™ cloth, or a welding blanket. Other alternatives include using material such as ceramic carbon fiber laminates, carbon composites, heat resistive materials, and IR reflective materials, such as "space" blankets, for the insulating material. The insulating layer can be complex or composed of any insulating material, alone in combination, or in composite. Some such insulating material are spun glass fiber, calcium-silicate fiber, alumina-silicate fiber, or amorphous silica fiber, and if use temperatures are low enough, some organic materials such and nylon fiber could be used. These materials can be in the form of loose mats or tight felts. These materials can be used in combination as layers with the more refractory material closer to the work and the lower temperature materials behind and farther away from the work. Other type insulating layers that are effective are those of the radiation insulation type such as reflective metals. Normally these would not be considered for use between the work and the coil wire, but they can be configured to function as radiation barriers without making deleterious effect on the electromagnetic coupling between the work and the wire coil. In one configuration small squares, disks or other simple shapes of thin reflective foil are attached to a backing or carrier; the foil is not continuous so that any induced currents in the foil will be low and not continuous over a large distance. The radiation layer can be attached to the inside or the outside of the protective layer The coil 103 is held in place by a plurality of straps 113, which may be Velcro in the preferred embodiment. Two straps are shown in FIG. 1, however additional numbers of straps, or other fasteners, may be used. One such alternative includes using pockets sewn into the fabric of blanket 104. Loops 110 are then fed through the pockets. A pair of flux concentrators 111, comprised of a ferrite material, help concentrate the flux in the desired direction. Additional flux concentrators 111 may be used, or positioned in other positions. Flux concentrators 111 may be held in place by Velcro fasteners snaps or other fasteners.

Litz wires 110 may be bent in virtually any direction, including perpendicular to the plane shown in FIG. 1, or any direction, because Litz wire is so flexible, it is easy to take the flat induction head and a bend it to the shape of any workpiece. For example, the induction head may be used to heat pipes wherein the relatively flat blanket is folded or bent around the curved pipe. In this application the coil is flexed along its longer direction (parallel to the weld path), and not flexed along its shorter direction (across the weld path). The ability to bend in this direction makes the head well-suited for heating a curved workpiece. Because the blanket may be flat, or bent to a very tight radius, it is useful with a large range of pipes, having virtually any diameter or any radius of curvature. It is very useful for the head to open to at least 180°, so it can be easily wrapped around a pipe or other workpiece.

Additionally, the ability of Litz wire to bend allows the head to be selectively coupled differently to various portions of the workpiece. For example, if a workpiece having sharp angles is to be heated, the corners of the workpiece will heat to a greater extent than the other regions. However, the Litz wire and induction head could be bent so that there is a gap between the induction head (or, more specifically, the induction coil) and the corner of the workpiece. This gap decreases the coupling between the induction head and the workpiece, thus reducing the heat delivered to the corner region. By properly choosing the size of the gap, it is possible to compensate for the natural tendency to deliver more heat to the corner. Alternatively, selective gaps may be used to heat some regions of a part more than the remaining regions.

The entire coil may be held in place around the part using velcro straps or other fasteners. If the coil in longer than the parts circumference, the excess length may be cinched together with the remaining length of the head held in place with velcro. The portion wrapped about the part couples with the part, and this heats the part, while the excess cinched length does not couple with anything, and remains relatively cool.

Temperature feedback is provided in one alternative embodiment. The temperature may be determined using an infrared temperature sensor, a thermocouple or an RTO. The sensed temperature is provided to the controller, which can then control the heat to the part in real-time.

One alternative includes heating the weld path after the weld is completed, to control the rate the weld path cools. The rate of cooling is slowed by adding heat as necessary, to prevent weak grain structures from forming.

Figure 2:
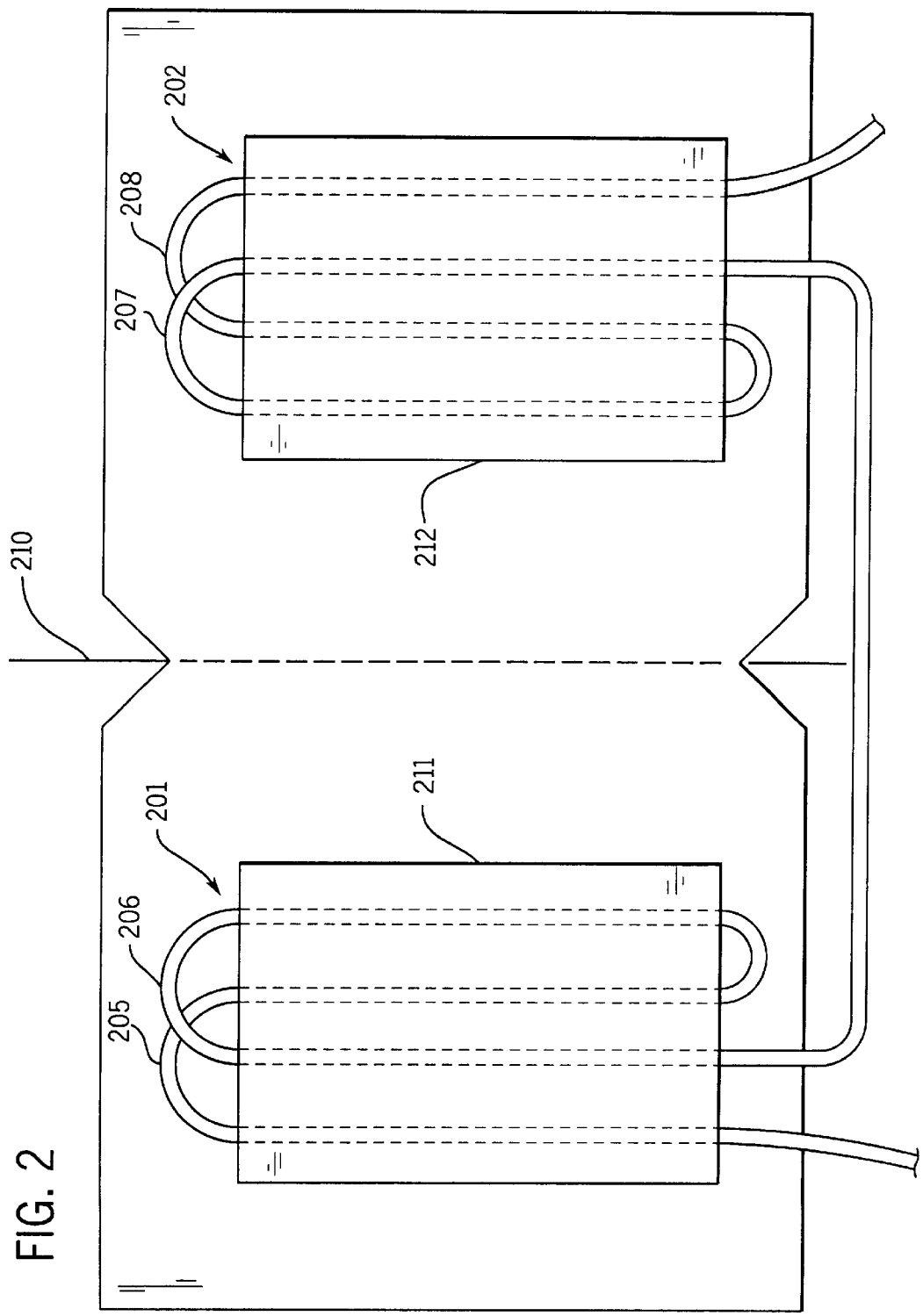
FIG. 2 is a diagram of an alternative induction head.

Another alternative, shown in FIG. 2, has a head comprised of two coil's 201 and 202, each having two Litz wire loops 205–208. Loops 205–208 are electrically in series and are disposed in a plurality of pockets 211 and 212 on a blanket. Coils 201 and 202 are disposed on-either side of a weld path 210. The head is wrapped around a pipe. One application was heating a 20 inch O.D. pipe, 0.625 inch wall, to 250° F. by applying power for two minutes, using a 5KW IHPS This head is also well suited to control the rate of cooling after a weld is completed Numerous modifications may be made to the present invention which still fall within the intended scope hereof. Thus, it should be apparent that there has been provided in accordance with the present invention an apparatus for induction heating that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A method of relieving heat stress from a weld between two cylindrical workpieces, comprising:

placing an induction coil comprised of Litz wire on either side of the weld;

flexing the coil about the workpieces; and heating the cylindrical workpieces along the weld, thereby relieving stress.

2. The method of claim 1, further comprising inducing heat at a frequency in at least the kilohertz range.

3. The method of claim 1, further including placing the coil in a blanket comprised of a silica fiber.

4. A method of relieving heat stress from a weld between two cylindrical workpieces comprising:

placing an induction coil on either side of the weld;

flexing the coil about the workpieces; and inducing heat in the workpiece at a frequency of at least in the kilohertz range, thereby relieving stress.

5. The method of claim 4, further comprising placing the coil comprised of Litz wire about the workpieces.

6. The method of claim 1, further including placing the coil in a blanket comprised of a silica fiber.

7. A method of relieving heat stress from a weld between two cylindrical workpieces, comprising:

placing an induction coil comprised of Litz wire in a blanket comprised of silica fiber;

placing the blanket on either side of the weld; and heating the cylindrical workpieces along the weld; thereby relieving stress.

8. A method of relieving heat stress from a weld between two cylindrical workpieces comprising:

placing an induction coil in a blanket comprised of silica fiber;

placing the blanket on either side of the weld; and inducing heat in the workpieces at a frequency of at least in the kilohertz range, thereby relieving stress.

* * * * *

UNITED STATES PATENT AND TRADEMARK OFFICE
CERTIFICATE OF CORRECTION

PATENT NO. : 6,346,690 B1
DATED : February 12, 2002
INVENTOR(S) : Ulrich et al.

It is certified that error appears in the above-identified patent and that said Letters Patent is hereby corrected as shown below:

Title page,
Item [63], Related Application Data, replace "Continuation of application No. 09/499,222, filed on Feb. 7, 2000, now Patent No. 6,229,126, which is a continuation of application No. 09/072,887, filed on May 5, 1998." with -- Continuation of application No. 09/499,222, filed on Feb. 7, 2000, which is a continuation of application No. 09/072,887, filed on May 5, 1998, now Patent No. 6,229,126. --

Column 1,
Lines 6-7 delete "and issued on May 8, 2001 as U. S. Pat. No. 6,229,126,".
Line 9, following "Coil" insert -- and issued on May 8, 2001 as U. S. Pat. No. 6,229,126 --.

Column 2,
Line 3, following "structure" delete ".".
Line 5, following "within the" delete ".".

Column 4,
Line 50, preceding "smaller" delete "are".

Column 5,
Line 7, replace "n" with -- in --.

Column 7,
Line 24, insert -- Alternatively, the weld path may be re-heated, and then slowly cooled to relieve stress. The stress relief is preferably accomplished using coils on either side of the weld. --

Signed and Sealed this

Tenth Day of June, 2003

JAMES E. ROGAN
*Director of the United States Patent and Trademark Office*